(12) United States Patent
Downey

(10) Patent No.: US 7,575,263 B2
(45) Date of Patent: Aug. 18, 2009

(54) CENTER HIDE AWAY FLOOR STORAGE WITH HI-RISE FEATURE

(75) Inventor: Brian Downey, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 232 days.

(21) Appl. No.: 11/517,625

(22) Filed: Sep. 8, 2006

(65) Prior Publication Data

US 2008/0061577 A1 Mar. 13, 2008

(51) Int. Cl.
*B60R 7/04* (2006.01)
(52) U.S. Cl. .................. 296/24.34; 296/37.14; 224/539
(58) Field of Classification Search .............. 296/24.34, 296/37.8, 37.14, 37.15, 37.16; 224/275, 224/484, 486, 487, 539, 541, 542, 544, 548, 224/557, 566; 297/188.14–188.19
See application file for complete search history.

(56) References Cited

U.S. PATENT DOCUMENTS

| | | | | |
|---|---|---|---|---|
| 4,577,821 A * | 3/1986 | Edmo et al. | ................. | 108/145 |
| 5,301,992 A * | 4/1994 | Whitmore | ................. | 296/37.1 |
| 5,947,416 A * | 9/1999 | Kraft | ................. | 244/118.5 |
| 6,003,927 A * | 12/1999 | Korber et al. | ................. | 296/37.8 |
| 6,145,447 A * | 11/2000 | Henderson | ................. | 108/44 |
| 6,343,835 B1 * | 2/2002 | Ledbetter | ................. | 297/188.2 |
| 7,370,898 B2 * | 5/2008 | Sturt et al. | ................. | 296/24.34 |
| 2002/0163215 A1 * | 11/2002 | Emerling et al. | ................. | 296/24.1 |
| 2004/0155478 A1 * | 8/2004 | Huber et al. | ................. | 296/76 |
| 2005/0052044 A1 * | 3/2005 | Toyota et al. | ................. | 296/24.34 |
| 2005/0082861 A1 * | 4/2005 | Kubota et al. | ................. | 296/24.34 |
| 2005/0236859 A1 * | 10/2005 | Sakakibara et al. | ................. | 296/37.8 |
| 2006/0131910 A1 * | 6/2006 | Cowelchuk et al. | ................. | 296/24.34 |
| 2007/0205623 A1 * | 9/2007 | Hung et al. | ................. | 296/24.34 |
| 2007/0295875 A1 * | 12/2007 | Haddad et al. | ................. | 248/311.2 |
| 2008/0079278 A1 * | 4/2008 | Rajappa et al. | ................. | 296/24.34 |
| 2008/0093873 A1 * | 4/2008 | Ogura | ................. | 296/24.34 |

* cited by examiner

*Primary Examiner*—Jason S Morrow
(74) *Attorney, Agent, or Firm*—Young Basile

(57) ABSTRACT

A storage apparatus for a motor vehicle includes a stationary platform connectible to a floor of the motor vehicle. A lid connects to the platform and moves between opened and closed positions. The lid engages with the platform when in the lowered position and includes an upper surface defining a reinforced ramp extending between two second row seats of the motor vehicle toward an elevated rear floor area. The platform includes an upwardly extending wall defining a reinforced support for the lid. The lid and the support being of sufficient strength to support foot traffic of vehicle occupants moving to and from the rear area of the motor vehicle. A reciprocal tray connects to the platform for movement between a raised position, and a lower stowed position. An articulated drive connects between the tray and the platform for moving the tray between raised and lowered positions.

23 Claims, 6 Drawing Sheets

US 7,575,263 B2

CENTER HIDE AWAY FLOOR STORAGE WITH HI-RISE FEATURE

FIELD OF THE INVENTION

The present invention relates to a storage apparatus for a motor vehicle, and more particularly to a storage apparatus including a stationary platform connectible to a floor of a vehicle and a lid movable between an opened position and a closed position, where the storage apparatus has sufficient strength to support foot traffic of vehicle occupants to and from a rear area of the vehicle, and/or a reciprocal inner tray within the storage apparatus.

BACKGROUND

Storage capacity in a passenger vehicle is a desirable characteristic. Trade offs are generally made between seating capacity, storage capacity, and traffic flow of occupants through the vehicle. It would be desirable to add additional storage capacity within a vehicle without adversely affecting seating capacity or traffic flow of occupants through the vehicle between various seating locations.

To be appreciated by the consuming public, storage capacity must be easily accessible and readily usable without adversely affecting other characteristics of the vehicle, such as styling and appearance. The most desirable storage locations are within easy access and reach of seated occupants of the vehicle. It would be desirable to provide a storage apparatus that can provide additional storage capacity within easy reach of a seated occupant of the vehicle without adversely affecting the seating capacity or flow of occupants through the vehicle to various seating locations.

SUMMARY

A storage apparatus for a motor vehicle can include a stationary platform connectible to a floor of a motor vehicle, a reciprocal tray connected to the platform and movable between a raised position and a lowered stowed position with respect to the stationary platform, and a lid connected to the platform to be movable between an opened positioned and a closed position, such that the lid is engageable with the platform to enclose the tray when in the lowered position.

A storage apparatus for a motor vehicle can include a stationary platform connected to a floor of a motor vehicle, and a lid pivotally connected to the platform to be movable between an opened position and a closed position, such that the lid is engageable with the platform when in the lowered position. The lid can have an upper surface defining a reinforced ramp extending between two second row seats of the motor vehicle toward an elevated rear floor area of the vehicle. The ramp can have sufficient strength to support foot traffic of vehicle occupants moving to and from the rear area of the motor vehicle. The platform can include at least one upwardly extending wall defining a reinforced support wall for the lid. The wall can be of sufficient strength to support foot traffic of vehicle occupants on top of the lid while moving to and from the rear area of the motor vehicle.

A storage apparatus for a motor vehicle can include a stationary platform connectible to a floor of a motor vehicle, a reciprocal tray connected to the platform and movable between a raised position and a lowered stowed position with respect to the stationary platform, an articulated drive connected between the tray and the platform for moving the tray between the raised position and the lowered stowed position, a lid connected to the platform movable between an open position and a closed position, a support for temporarily holding the lid in the open position, and a hinge connecting the lid to the platform, where the hinge prevents rotation beyond a predetermined point generally aligned with a back of an adjacent seat of the motor vehicle. The lid can be engageable with the platform to enclose the tray when in the lowered position, and the lid can have an upper surface defining a reinforced ramp extending between two second row seats of the motor vehicle. The platform can include at least one upwardly extending wall defining a reinforced support wall for the lid. The ramp and the wall can be of sufficient strength to support foot traffic of vehicle occupants on top of the lid while moving to and from the rear area of the vehicle.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

Referring now to FIGS. 1 and 2, a storage apparatus 10 for a motor vehicle 12 can include a stationary platform 14 connectible to a floor 16 of the motor vehicle 12. A lid 18 connected to the platform 14 can be movable between an opened position (best seen in FIGS. 3, 4, and 6) and a closed position (best seen in FIGS. 1, 2, and 5). The lid 18 can engage with the platform 14 when in the lowered position, where an upper surface 20 of the lid 18 defines a reinforced ramp 22 extending between two second row seats 24 (only one seat being shown in FIGS. 1-4 in phantom for clarity) of the motor vehicle 12 towards an elevated rear floor area 26 of the vehicle 12. The platform 14 can include at least one upwardly extending wall 28 defining a reinforced support 30 for the lid 18. The ramp 22 and support 30 are of sufficient strength to support foot traffic of vehicle occupants on top of the lid 18 while moving to and from the elevated rear floor area 26 of the motor vehicle 12.

Referring now to FIG. 3, a support member 32 can be provided for temporarily holding the lid 18 in the opened position. The support member can be used if needed to counter an overall mass of the lid 18, or to act as a lid slamming prevention device in case the motor vehicle experiences sudden braking resulting in momentum of the lid attempting to slam the lid to the closed position. The support member 32 can be tuned for a small stature individual in order to allow the lid 18 to be easily pushed sufficiently with minimal pressure resistance to move the lid 18 from the opened position to the closed position. The support member 32 can include a reciprocal piston 34 operably engaged within a cylinder 36 and attached to the lid 18 inside of a slotted groove 38 on a non-show side 40 of the lid 18. The support member 32 can also include a T-shaped end that can be fit into a defined groove on an underside or a non-show side 40 of the lid 18.

Referring now to FIG. 4 and FIG. 5, the storage apparatus 10 according to an embodiment of the present invention can include a reciprocal inner tray 42 connected to the platform 14 and movable between a raised position (best seen in FIG. 4) and a lowered stowed position (best seen in FIG. 5) with respect to the stationary platform 14. The amount of reciprocal tray 42 rise between the lowered stowed position and the raised position can correspond to an approximate seat cushion height surface 44, so that an occupant of an adjacent seat can readily be able to access an interior of the storage apparatus 10 or any contents stored therein. The tray 42 can be fitted with any desirable storage features, such as slots, dovetail grooves, or other known methods of mechanical fastening, so that an accessory part with features, such as a cup holder or DVD remote control, or change holder could be held in place. An articulated drive 46 can be connected between the tray 42 and the platform 14 for moving the tray 42 between the raised position and the lowered stowed position. The articulated drive 46 can include at least one reciprocal piston type leg 48 operably engaged within a cylinder 50 and connected between the tray 42 and the platform 14. The articulated drive 46 can include at least one scissor locking type leg 52 connected between the tray 42 and the platform 14. The piston type leg 48 or scissor locking type leg 52 can be tuned to provide support for the storage apparatus 10 and to support a predetermined amount of allowable mass stowed inside the storage apparatus 10. The articulated drive 46 can be powered by any suitable mechanical force mechanism, by way of example and not limitation, spring powered, fluid pressure powered, electric powered or the like. By way of example and not limitation, if spring bias is provided toward the raised position, manual manipulation can be used to return the reciprocal tray 42 to the lowered stowed position while simultaneously loading the spring force for returning the tray 42 to the raised position. A latch mechanism can be provided for maintaining the tray 42 in the lower stowed position until released. As best seen in FIG. 5, the reciprocal inner tray 42 when in the lowered stowed position is enclosed within the stationary platform 14 by the lid 18 connected to the platform 14. The articulated drive 46 with scissor locking type leg 52, by way of example and not limitation, such as piston type legs 48 and cylinders 50, are shown in FIG. 5 in the lowered stowed position.

Referring now to FIG. 6, a hinge 54 can connect the lid 18 to the platform 14. The hinge 54 can prevent rotation of the lid 18 beyond a predetermined point generally aligned with a back 56 of an adjacent seat 24 as best seen in FIG. 4. The support member 32 can be connected to the reciprocal inner tray 42 at one end and connected to a slotted groove 38 on an underside 40 of the lid 18 allowing the support member 32 to maintain the lid 18 in an open position with the tray 42 in the raised position, or the lowered stowed position, or any point in between.

Figure 1:
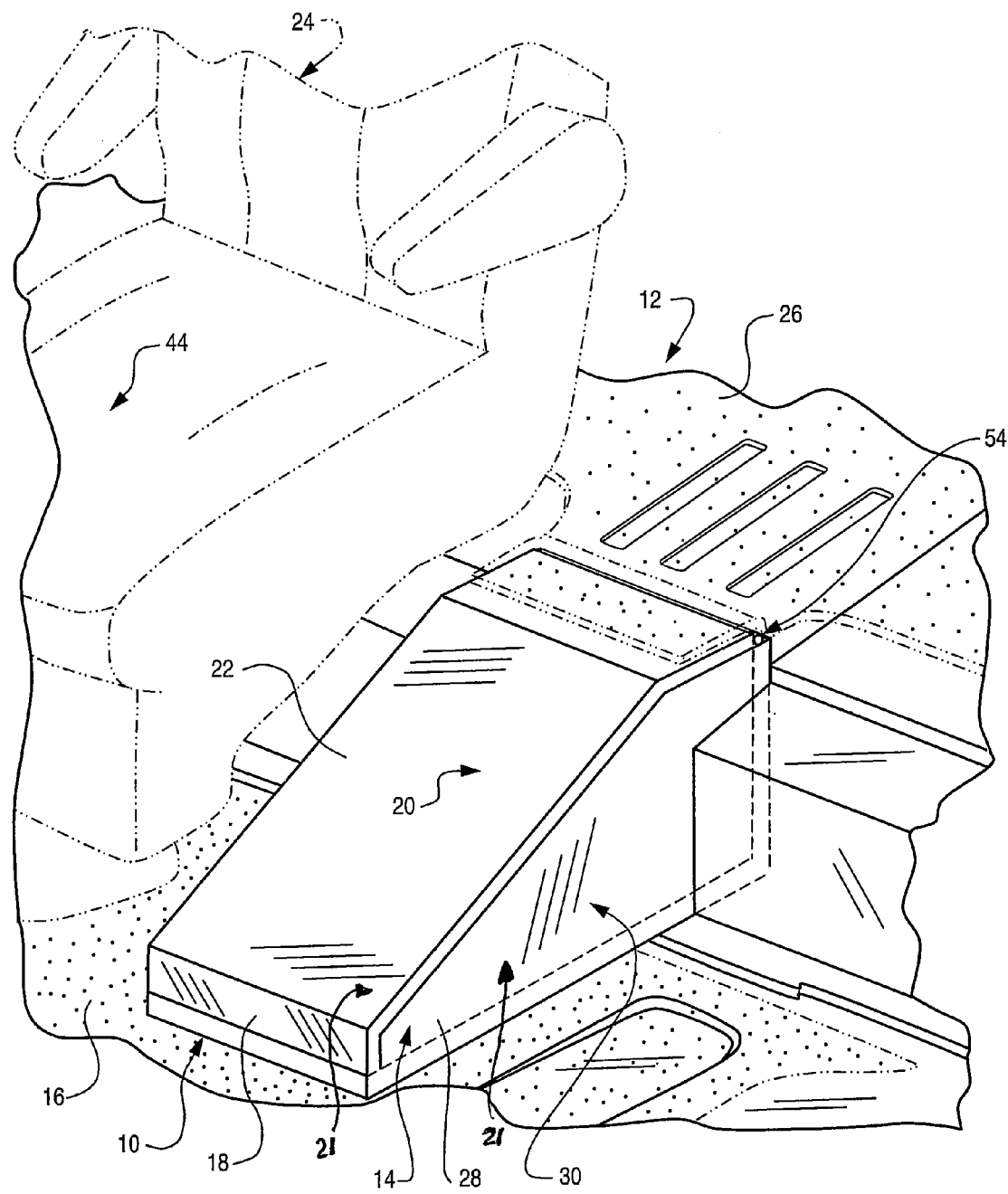
FIG. 1 is a perspective view of a storage apparatus for a motor vehicle located between two second row seats of the motor vehicle with a lid engageable with a platform in a closed position to enclose a tray in a lowered position, where the lid and platform define a ramp of sufficient strength to support foot traffic of vehicle occupants to and from a rear area of a motor vehicle.
Figure 2:
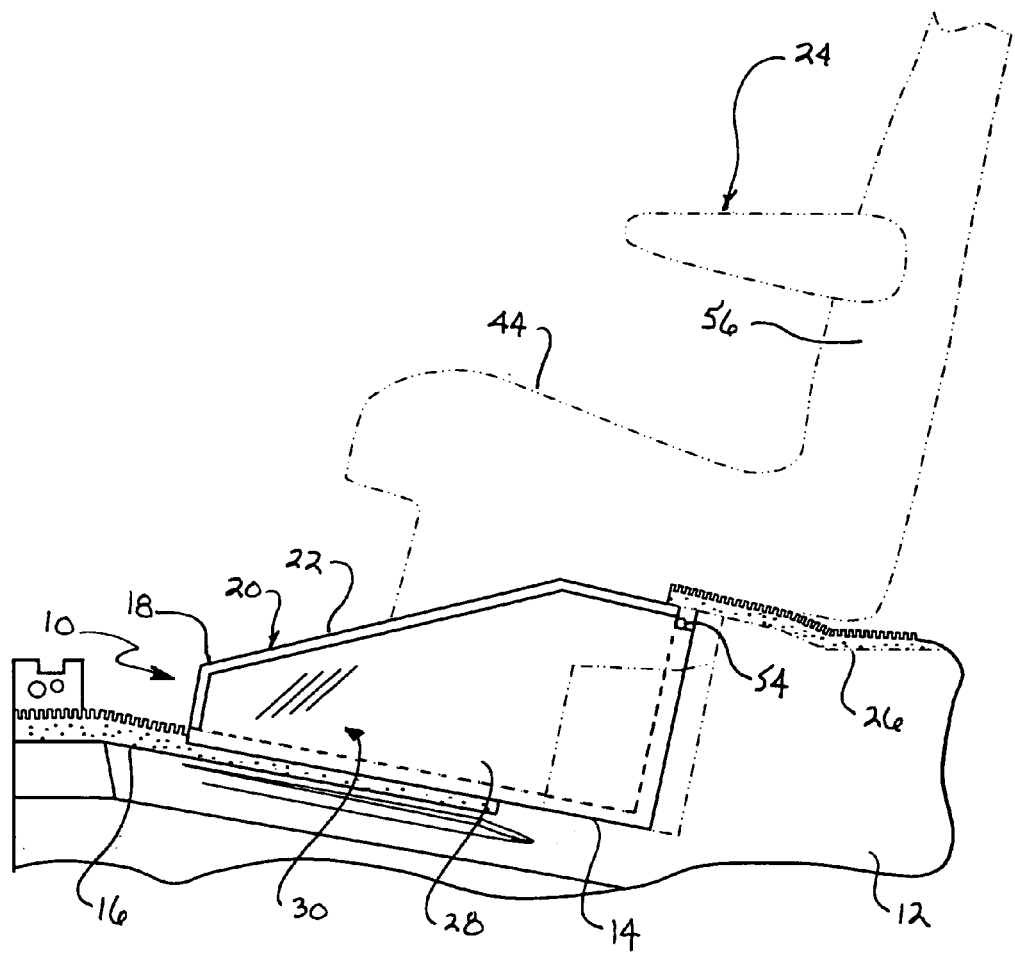
FIG. 2 is a side elevational view of the storage apparatus illustrated in FIG. 1.
Figure 3:
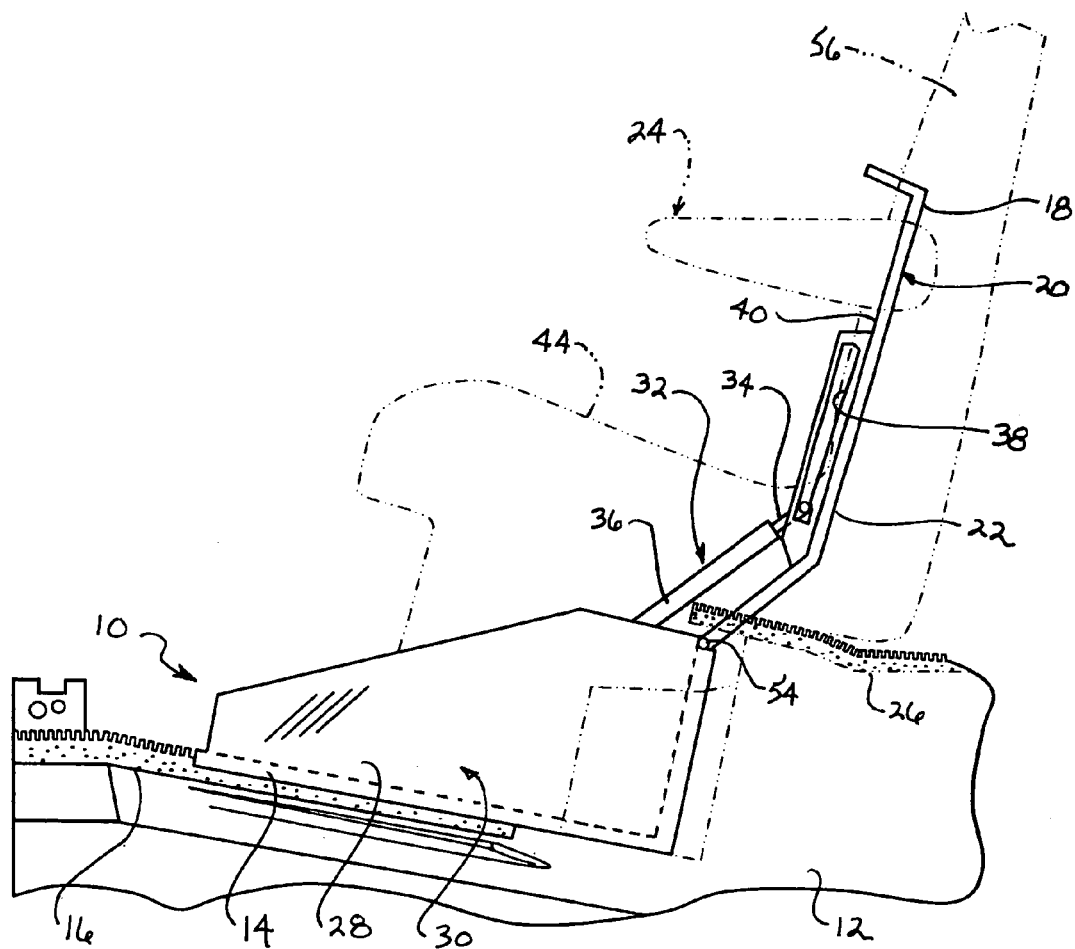
FIG. 3 is a side elevational view of the storage apparatus illustrated in FIG. 1 with the lid moved to an opened position as the lid rotates about a hinge which prevents rotation beyond a predetermined point generally aligned with the back of an adjacent seat of the motor vehicle.
Figure 4:
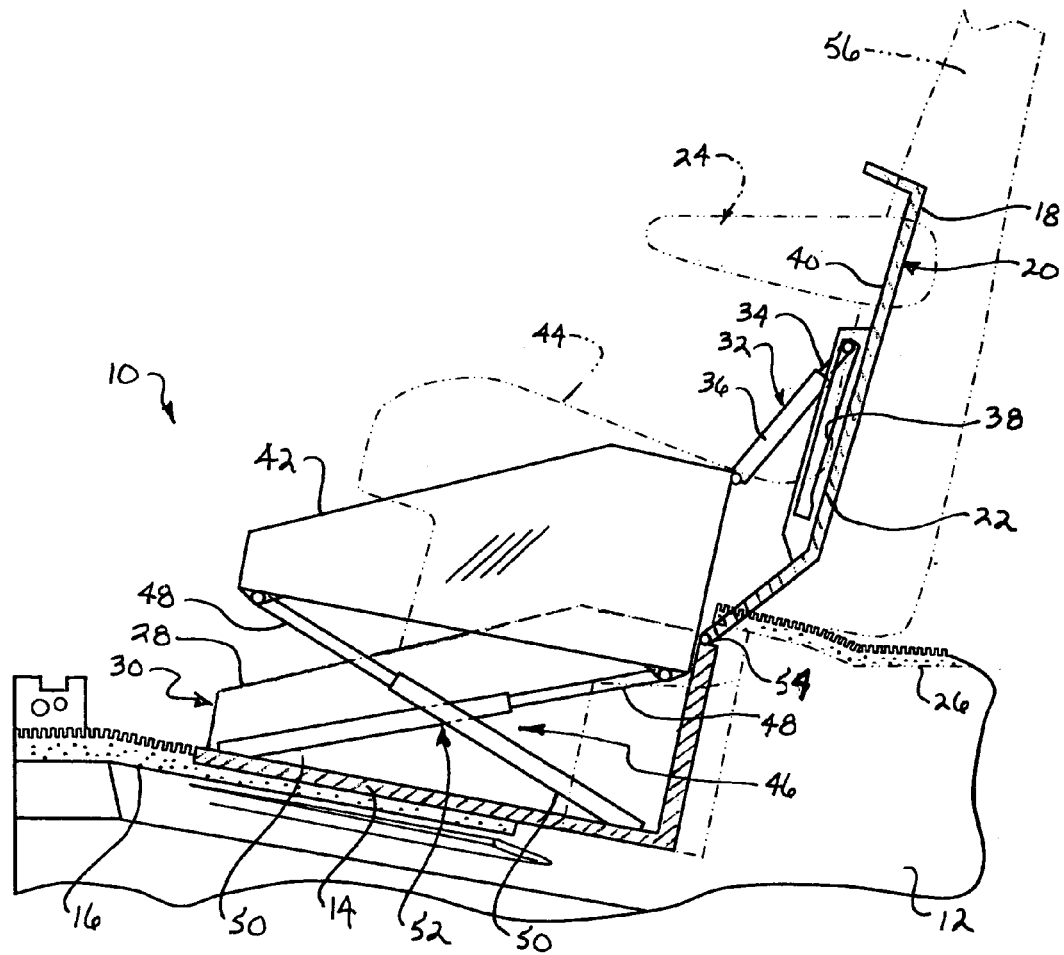
FIG. 4 is a side elevational view of the storage apparatus illustrated in FIG. 1 with part of the platform not shown to more clearly illustrate a reciprocal inner tray connected to the platform movable between the lowered stowed position to the illustrated raised position by an articulated drive connected between the reciprocal inner tray and the platform, and a support member for temporarily holding the lid in the opened position.
Figure 5:
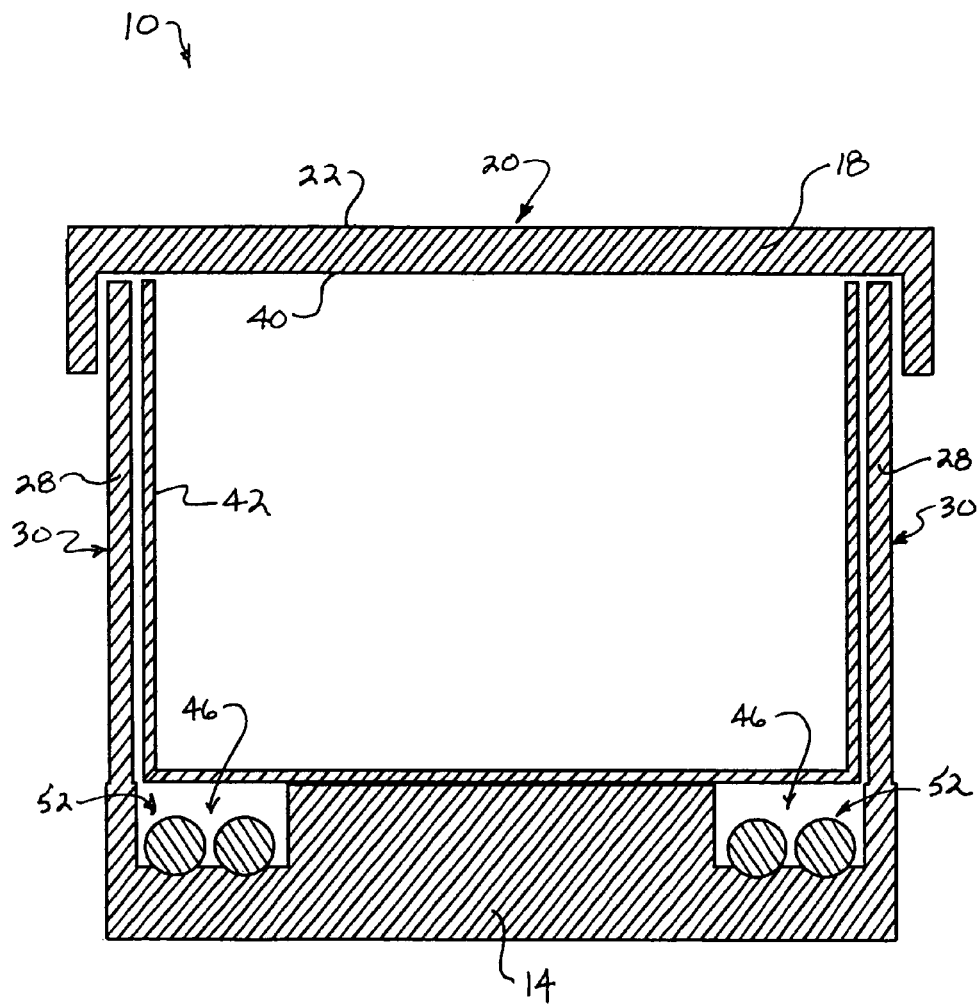
FIG. 5 is a front cross-sectional view of the storage apparatus illustrated in FIG. 1 showing the stationary platform, reciprocal inner tray, lid, and articulated drive with the inner tray in the lowered stowed position, and a lid in the closed position with respect to the stationary platform.
Figure 6:
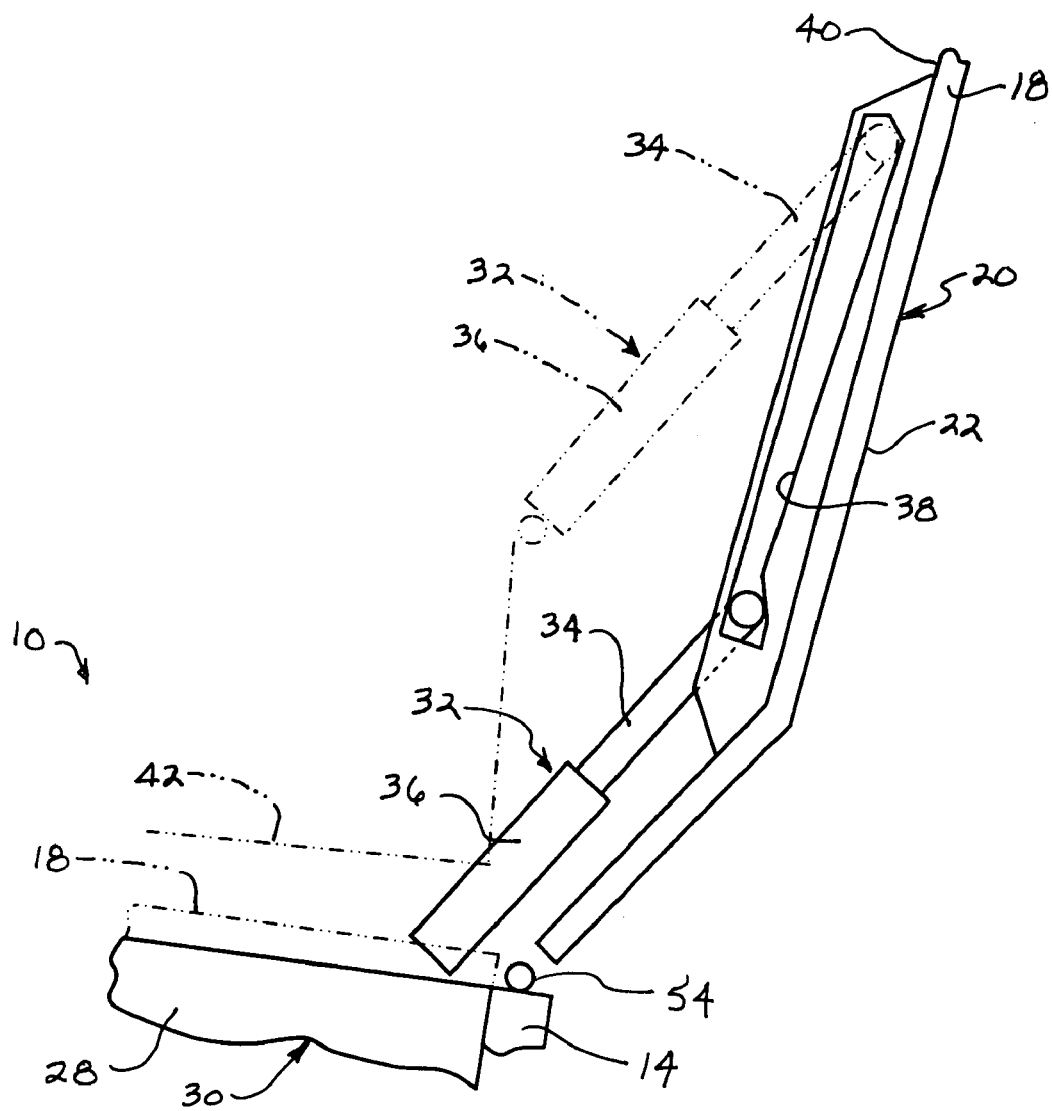
FIG. 6 is a detailed side view of the lid, hinge connection of the lid to the stationary platform, and the support member extending between a reciprocal inner tray and the lid for temporarily holding the lid in the opened position.

The platform 14 of the storage apparatus 10 can be set into a motor vehicle 12 either by a mechanical fastener or any other suitable means. The storage apparatus 10 is constructed so that a large occupant walking on top of the assembly would not adversely affect the storage apparatus 10, lid 18, or related components or shapes. If required, reinforcement ribs 21 can be provided to the platform 14 and/or upwardly extending wall 28, and/or lid 18. Reinforcement ribs 21 are shown on the lid 18 in FIG. 1. The hinge 54 can prevent the lid 18 from rotating past a set point so as not to interfere with third row passengers.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A storage apparatus for a motor vehicle comprising:
   a stationary platform connectible to a floor of a passenger compartment;
   a reciprocal tray connected to the platform and moveable between a raised position and a lowered stowed position with respect to the stationary platform; and
   a lid connected to the platform and moveable between an opened position and a closed position, the lid engageable with the platform to enclose the tray when in the lowered position, the lid defining an upper surface extending between a front area and a rear area of the passenger compartment.

2. The storage apparatus of claim 1, wherein the upper surface defines a ramp adjacent to a seat of the motor vehicle, the ramp of sufficient strength to support foot traffic of vehicle occupants to and from the rear area of the passenger compartment.

3. The storage apparatus of claim 2, wherein the platform further comprises:
   at least one upwardly extending wall defining a support for the lid, the wall of sufficient strength to support foot traffic of vehicle occupants on top of the lid while moving to and from the rear area of the passenger compartment.

4. The storage apparatus of claim 1 further comprising:
   a support member for temporarily holding the lid in the opened position.

5. The storage apparatus of claim 4, wherein the support member comprises a reciprocal piston operably engaged within a cylinder.

6. The storage apparatus of claim 4, wherein the support member comprises a rigid T-shaped arm operably engageable between the lid and the reciprocal tray.

7. The storage apparatus of claim 1 further comprising:
   an articulated drive connected between the tray and the platform for moving the tray between the raised position and the lowered stowed position.

8. The storage apparatus of claim 7, wherein the articulated drive further comprises:

at least one reciprocal piston type leg operably engaged within a cylinder and connected between the tray and the platform.

9. The storage apparatus of claim 7, wherein the articulated drive further comprises:
at least one scissor locking type leg connected between the tray and the platform.

10. The storage apparatus of claim 1 further comprising:
a hinge connecting the lid to the platform.

11. The storage apparatus of claim 10, wherein the hinge prevents rotation beyond a predetermined point generally aligned with a back of an adjacent seat of the motor vehicle.

12. A storage apparatus for a motor vehicle comprising:
a motor vehicle floor including a first section and a second section that is raised relative to the first section;
at least one wall extending between the first and second sections of the motor vehicle floor; and
a lid pivotally connected to the at least one wall and moveable between an opened position and a closed position, the lid engageable with the motor vehicle floor when in the closed position, the lid having an upper surface defining a ramp adjacent to a seat of the motor vehicle extending toward the second section of the motor vehicle floor, the ramp and at least one wall of sufficient strength to support foot traffic of vehicle occupants to and from the second section of the motor vehicle floor.

13. The storage apparatus of claim 12 further comprising:
a support member for temporarily holding the lid in the opened position.

14. The storage apparatus of claim 13, wherein the support member comprises a reciprocal piston operably engaged within a cylinder.

15. The storage apparatus of claim 13, wherein the support member comprises a rigid T-shaped arm.

16. The storage apparatus of claim 12 further comprising:
a reciprocal tray supported by the motor vehicle floor and moveable between a raised position and a lowered stowed position with respect to the first section of the motor vehicle floor.

17. The storage apparatus of claim 16 further comprising:
an articulated drive connected between the tray and the motor vehicle floor for moving the tray between the raised position and the lowered stowed position.

18. The storage apparatus of claim 17, wherein the articulated drive ye further comprises:
at least one reciprocal piston type leg operably engaged within a cylinder and connected between the tray and the motor vehicle floor.

19. The storage apparatus of claim 17, wherein the articulated drive further comprises:
at least one scissor locking type leg connected between the tray and the motor vehicle floor.

20. A storage apparatus for a motor vehicle comprising:
a stationary platform connectible to a floor of a motor vehicle;
a reciprocal tray connected to the platform and moveable between a raised position and a lowered stowed position with respect to the stationary platform;
an articulated drive connected between the tray and the platform for moving the tray between the raised position and the lowered stowed position;
a lid connected to the platform and moveable between an opened position and a closed position, the lid engageable with the platform to enclose the tray when in the lowered position, the lid having an upper surface defining a ramp adjacent to a seat of the motor vehicle, the ramp of sufficient strength to support foot traffic of vehicle occupants to and from a rear area of the motor vehicle, wherein the platform includes at least one upwardly extending wall defining a support for the lid, the wall of sufficient strength to support foot traffic of vehicle occupants on top of the lid while moving to and from the rear area of the motor vehicle;
a support member for temporarily holding the lid in the opened position; and
a hinge connecting the lid to the platform, wherein the hinge prevents rotation beyond a predetermined point generally aligned with a back of the seat of the motor vehicle.

21. The storage apparatus of claim 3, wherein one or both of the support and the ramp are reinforced.

22. The storage apparatus of claim 12, wherein one or both of the ramp and the at least one wall are reinforced.

23. The storage apparatus of claim 20, wherein one or both of the support and the ramp are reinforced.

* * * * *